(12) United States Patent
Mitchell et al.

(10) Patent No.: US 11,698,121 B2
(45) Date of Patent: Jul. 11, 2023

(54) WIRE ATTACHMENT

(71) Applicant: Fort Wayne Metals Research Products Corp, Fort Wayne, IN (US)

(72) Inventors: Robert A. Mitchell, Huntington, IN (US); James D. Girardot, Fort Wayne, IN (US)

(73) Assignee: Fort Wayne Metals Research Products, LLC, Fort Wayne, IN (US)

( * ) Notice: Subject to any disclaimer, the term of this patent is extended or adjusted under 35 U.S.C. 154(b) by 284 days.

(21) Appl. No.: 16/834,642

(22) Filed: Mar. 30, 2020

(65) Prior Publication Data

US 2021/0088109 A1   Mar. 25, 2021

Related U.S. Application Data

(60) Provisional application No. 62/904,264, filed on Sep. 23, 2019.

(51) Int. Cl.
*F16G 11/12* (2006.01)
*F16G 11/04* (2006.01)

(52) U.S. Cl.
CPC .............. *F16G 11/12* (2013.01); *F16G 11/04* (2013.01)

(58) Field of Classification Search
CPC ...... F16G 11/02; Y10T 24/49; Y10T 24/3993; Y10T 24/398
See application file for complete search history.

(56) References Cited

U.S. PATENT DOCUMENTS

| | | | | |
|---|---|---|---|---|
| 2,209,673 | A * | 7/1940 | Bratz | H01R 43/058 24/114.5 |
| 3,184,817 | A | 5/1965 | Archer | |
| 3,583,060 | A * | 6/1971 | Sigmans | F16G 11/02 29/445 |
| 3,638,975 | A | 2/1972 | Buettner | |
| 4,164,806 | A * | 8/1979 | Stone | B44B 5/008 84/297 S |
| 4,498,222 | A * | 2/1985 | Ono | F16G 11/02 24/703.1 |

(Continued)

FOREIGN PATENT DOCUMENTS

DE   9113166 U1 * 3/1992
JP   4199783 B2 * 12/2008

OTHER PUBLICATIONS

International Search Report and Written Opinion received for PCT Patent Application No. PCT/US2020/025753, dated Jul. 20, 2020.

*Primary Examiner* — Robert Sandy
(74) *Attorney, Agent, or Firm* — Faegre Drinker Biddle & Reath LLP

(57) ABSTRACT

A swaged fitting can be fixed to a wire rope while simultaneously providing a desired shape and size, thereby avoiding the need for subsequent material removal. In one application, the swaged fitting is fixed to the wire rope by a forging operation such that the fitting is securely fixed provides a straight-sided construct once fixed to the wire rope. After the forging operation and without further material removal, the straight sides of the finished fitting are generally parallel to the longitudinal axis of the wire rope, while the end surfaces of the fitting are generally perpendicular to this longitudinal axis. This arrangement provides a strong and effective force-transfer interface for, e.g., end-effectors in medical devices.

24 Claims, 4 Drawing Sheets

(56) References Cited

U.S. PATENT DOCUMENTS

| | | | |
|---|---|---|---|
| 5,207,701 A | 5/1993 | West | |
| 5,720,747 A | 2/1998 | Burke | |
| 5,816,094 A | 10/1998 | Birks | |
| 6,035,692 A | 3/2000 | Lucas | |
| 7,073,828 B2 * | 7/2006 | Foigel | G09F 3/0352 292/307 R |
| 7,172,225 B2 * | 2/2007 | Foigel | G09F 3/0352 292/307 R |

* cited by examiner

WIRE ATTACHMENT

CROSS-REFERENCE TO RELATED APPLICATION

This application claims the benefit of U.S. Provisional Application Ser. No. 62/904,264, filed Sep. 23, 2019 and entitled WIRE ATTACHMENT, the entire disclosure of which is hereby expressly incorporated herein by reference.

BACKGROUND

1. Technical Field

The present disclosure relates to an attachment designed to be fixed to a wire and, in particular, to a crimped-on attachment for a multi-stranded or deformable wire or wire rope.

2. Description of the Related Art

Wire ropes are multi-stranded wire constructs used for a variety of actuation and force-transfer applications. In the medical device industry, small-diameter wire ropes are used for actuation of end-effectors in medical devices, such as robotic surgical instruments. Such applications require a low profile or narrow centerline spacing such as four or more wire elements anchored circumferentially around a small cylindrical shaft.

In some applications, a wire rope includes a fitting swaged to the wire rope along its length. This fitting may be used to actuate an end-effector in one of two directions through the application of tension on one of the two ends of the wire rope. The swaged fitting acts to transfer the tensile forces from the wire rope to the end effector.

Known swaged fittings may be swaged to the wire rope at a desired location, with subsequent material removal operations, such as grinding or EDM processes, to form the desired shape and size for actuation.

What is needed is an improvement over the foregoing.

SUMMARY

The present disclosure provides a swaged fitting which can be fixed to a wire rope while simultaneously providing a desired shape and size, thereby avoiding the need for subsequent material removal. In one application, the swaged fitting is fixed to the wire rope by a forging operation such that the fitting is securely fixed provides a straight-sided construct once fixed to the wire rope. After the forging operation and without further material removal, the straight sides of the finished fitting are generally parallel to the longitudinal axis of the wire rope, while the end surfaces of the fitting are generally perpendicular to this longitudinal axis. This arrangement provides a strong and effective force-transfer interface for, e.g., end-effectors in medical devices.

In one form thereof, the present disclosure provides an actuator assembly including a wire rope including a plurality of wire elements, the wire rope having a pair of opposing terminal ends, and a fitting fixed along a length of the wire rope and spaced from each of the pair of opposing terminal ends. The fitting includes a body with a straight-sided sidewall defining a longitudinal body axis, an aperture formed through the straight-sided sidewall of the body, the aperture defining a longitudinal aperture axis substantially perpendicular to the body axis, and a pair of end surfaces defining opposing longitudinal ends of the body.

In another form thereof, the present disclosure provides a precursor fitting for a wire rope, including a straight-sided body defining a longitudinal body axis and an aperture formed through the straight-sided body. The aperture defines a longitudinal aperture axis substantially perpendicular to the body axis and sized to receive the wire rope such that a void is formed between the wire rope and an interior surface of the aperture. The precursor fitting further includes a pair of end surfaces on opposing ends of the straight-sided body, and a pair of bosses sitting proud of the respective pair of end surfaces. The pair of bosses collectively defines a volume commensurate with a volume of the void.

In yet another form thereof, the present disclosure provides a method of affixing a fitting to a wire rope, including passing the wire rope through an aperture formed in the fitting, the wire rope having a plurality of wire elements and the aperture defining an aperture axis. The method further includes impacting an end surface of the fitting to cause material to flow into the aperture and into contact with the wire rope, and by the step of impacting, forming a substantially planar end surface of the fitting that is substantially parallel to the aperture axis.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Figure 1:
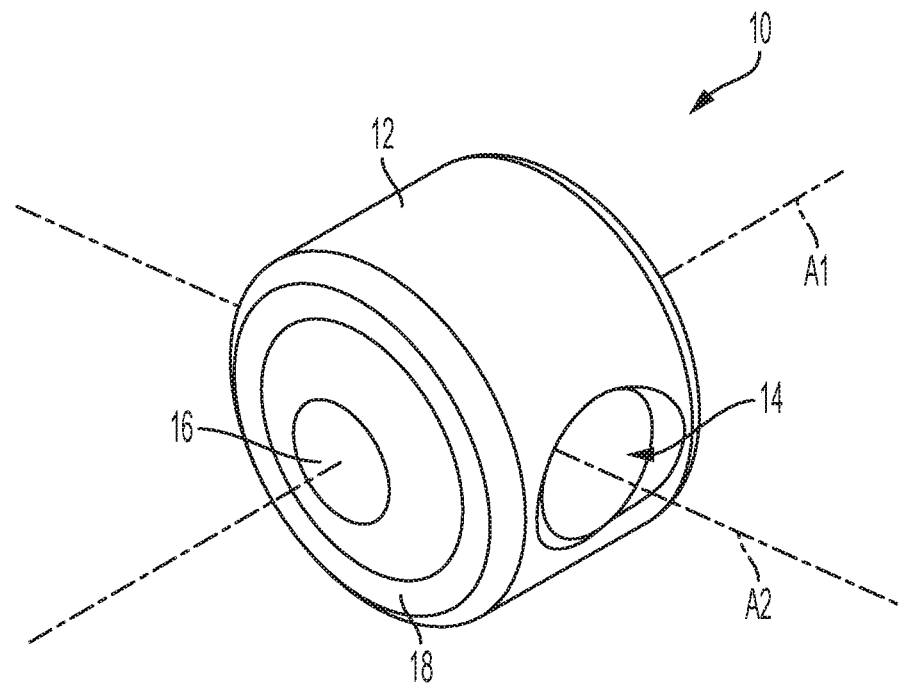
FIG. 1 is a perspective view of a fitting made in accordance with the present disclosure, shown as a precursor before integration with a wire rope.

Corresponding reference characters indicate corresponding parts throughout the several views. The exemplifications set out herein illustrates embodiments of the invention, the embodiments disclosed below are not intended to be exhaustive or to be construed as limiting the scope of the invention in any manner.

DETAILED DESCRIPTION

The present disclosure provides a fitting 100 for wire ropes 120 (FIGS. 4 and 5) with superior force-transfer capabilities, and a method and apparatus for producing the same.

Figure 2:
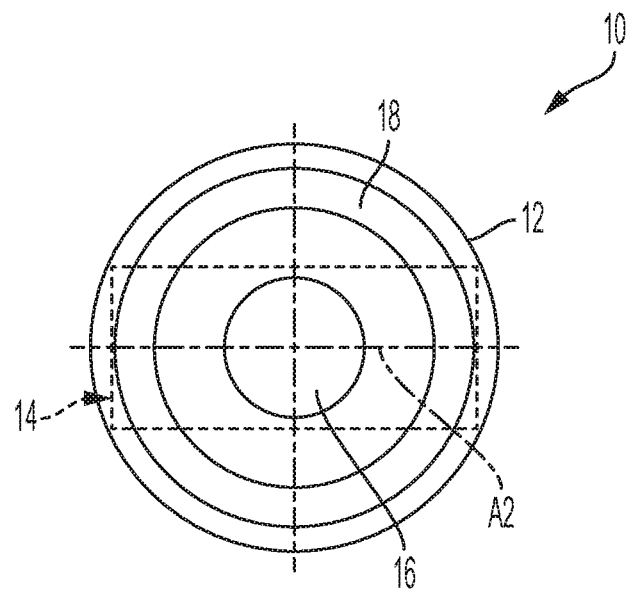
FIG. 2 is a front elevation view of the fitting shown in FIG. 1.
Figure 3:
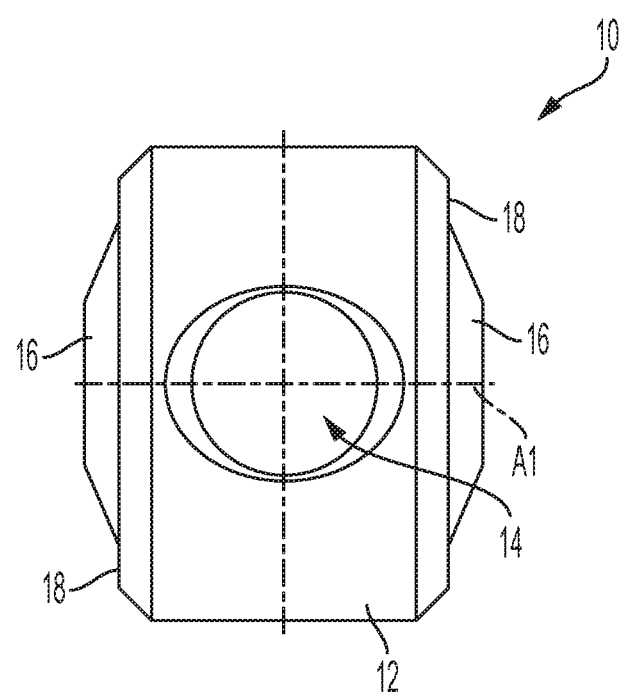
FIG. 3 is a side elevation view of the fitting shown in FIG. 1.

FIGS. 1-3 show precursor fitting 10, which is manufactured to be fitted to a cable 120 (FIGS. 4 and 5) and fixed thereto as further described below. Fitting 10 has a generally cylindrical exterior sidewall 12, defining longitudinal axis A1, and a bore 14 formed through sidewall 12 defining longitudinal axis A2. Axis A1 of sidewall 12 is substantially perpendicular to axis A2 of bore 14, while the two end surfaces 18 of fitting 10 are substantially perpendicular to axis A1 and substantially parallel to axis A2. This arrangement enhances the ability for fitting 100 (FIGS. 4-5) to effect transfer of tensile forces in cable 120 (FIGS. 4-5) to an end-effector (not shown), as further described below.

Although fitting 10 is shown having cylindrical sidewall 12, other straight-sided sidewall designs may be employed such as cuboid shapes and the like. Generally speaking, such straight sides define a plurality of tangent planes, all of which are parallel to axis A1 and thereby define axis A1. In the case of cylindrical sidewall 12, an infinite number of such tangent planes exist around the circumference of sidewall 12. In the case of a cuboid-shaped sidewall, four planes are defined by four straight sides to define axis A1 which is substantially perpendicular to axis A2. The two remaining sides of the cuboid would then form the end surfaces 18. Other shapes may also be used in accordance with the present disclosure, including uniform prisms such as triangular prisms, hexagonal prisms, octagonal prisms, and the like, or other rounded shapes such as one with a cross-section of an ellipse. For purposes of the present disclosure, "substantially perpendicular" means defining an angle between 88 and 92 degrees.

In an alternative embodiment, the straight-sided sidewall 12 may form a draft angle relative to axis A1. For example, the cylindrical sidewall 12 shown in FIGS. 1-4 may have slight conicality. Such a surface is still straight-sided, in that the surface defines a linear profile in an elevation view (e.g., a view in the plane of axis A1, such as the view of FIG. 3).

Figure 4:
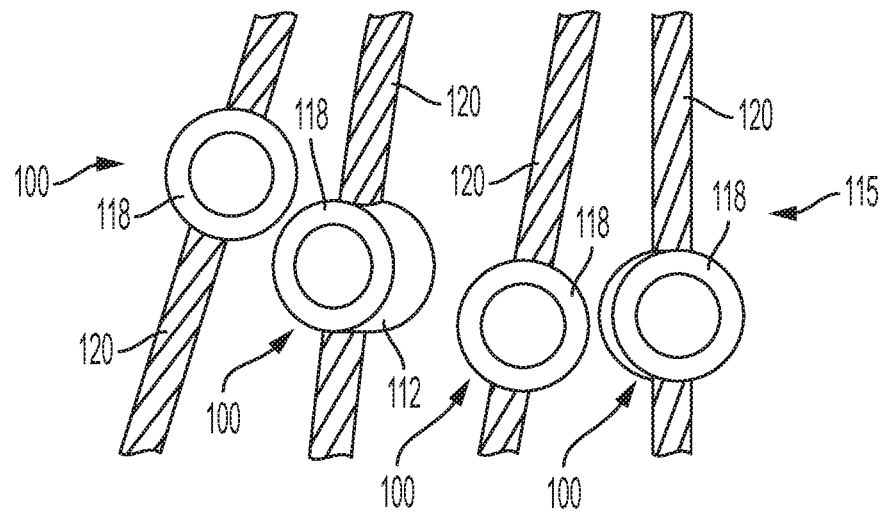
FIG. 4 is a perspective view, drawn to scale, of a plurality of the fitting shown in FIG. 1, shown after integration with the wire rope and in comparison with a United States penny having a diameter of 0.75 inches.
Figure 5:
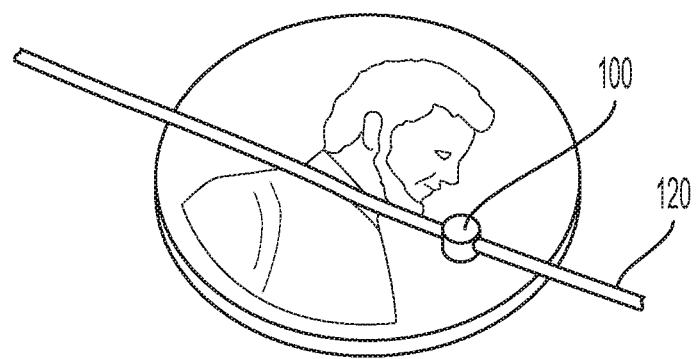
FIG. 5 is another perspective view of one of the fittings and wire ropes shown in FIG. 4.

Fitting 10 includes bosses 16 centered upon each axial end surface 18. Each boss 16 sits proud of its adjacent axial end surface, and is calculated to define and contain a volume which will fully fill the void between cable 120 and the inner surface of bore 14 when a forging force is applied to bosses 16 as described below. In addition, each boss 16 forms a truncated conical shape calculated to displace substantially all of the volume of boss 16 into the aforementioned void through a forging-type material flow, leaving each finished exterior surface 118 of the fitting 100 (FIG. 4) substantially planar and coincident with the respective original end surface 18 (FIG. 1). For purposes of the present disclosure, "substantially planar" means a small variation of the surface from its nominally-defined plane, such as a maximum variation across the surface of less than 5% of its diameter (or other maximum lateral extent, in the case of a non-round surface). In FIG. 4, for example, it can be seen that the original circular profile of the boss 16 may still be visible as a small indentation in fitting 100. However, such an indentation extends less than 5% into the otherwise planar surface 118 defined by fitting 100, such that the entire surface may be referred to as "substantially planar."

In FIGS. 1-3, a pair of bosses 16 on the respective end surfaces 18 is shown and described. However, it is also contemplated that a single boss 16 may be used on one of the end surfaces 18. In this configuration, the other end surface 18 may be planar and may remain in substantially the same planar configuration before and after the forging process described in detail herein.

For non-cylindrical shapes used in connection with fittings made in accordance with the present disclosure, the bosses may have complementary shapes with an angled surface corresponding to the each of the straight-sided surfaces of the finished fitting. For example, a cuboid fitting may include four angled surfaces each meeting the exterior surface of the fitting along a line parallel to a respective adjacent straight-side surface. Other shapes may have angled surfaces similarly complementary to their straight-sided surfaces.

Figure 6:
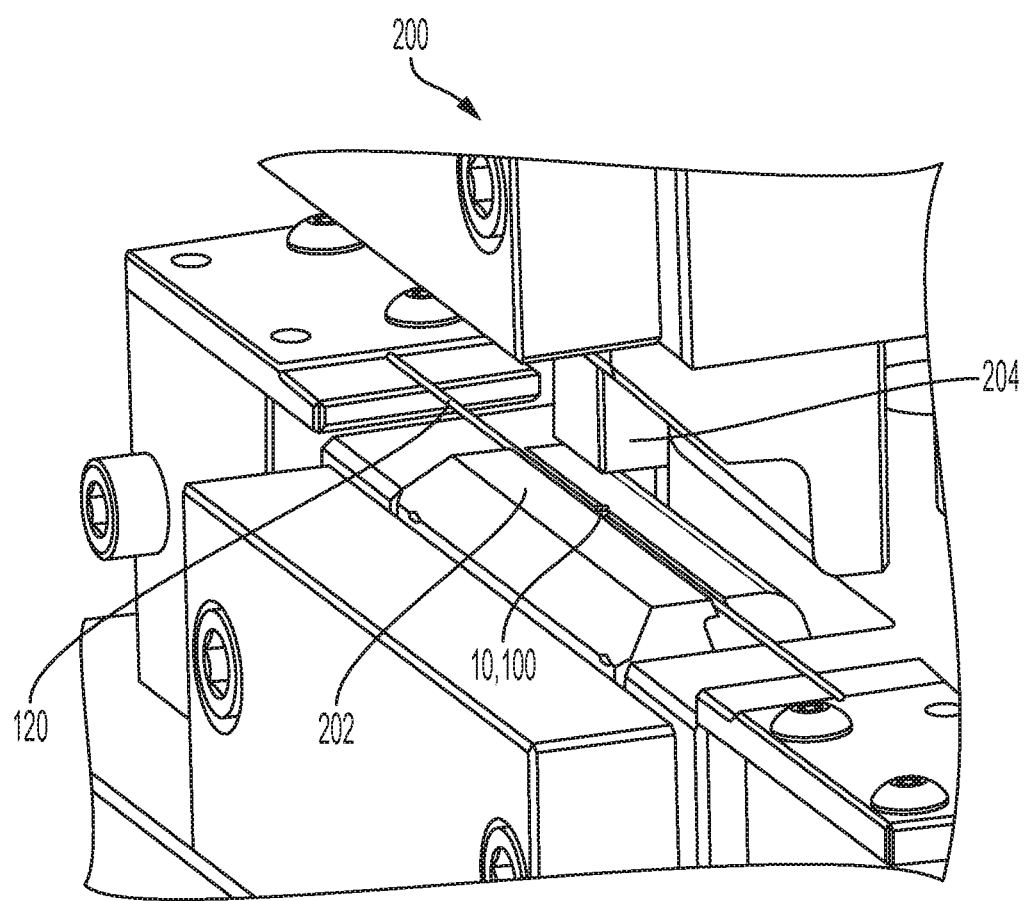
FIG. 6 is a perspective view of a die assembly used to produce the fittings shown in FIGS. 4 and 5 from the precursors shown in FIGS. 1-3.

FIG. 6 illustrates an exemplary apparatus 200 for the forging operation which converts the precursor fitting 10 into the finished fitting 100 fitted to wire rope 120. In the illustrated embodiment, wire rope 120 is made from a number of individual monolithic wire elements wound or braided together. These individual elements may be formed directly into the finished wire rope 120, or may be formed into a number of multi-element strands that are, in turn, wound or braided together to form wire rope 120. For medical device applications, wire rope 120 may have an overall diameter between 0.0015 in. and 0.187 in., and may be formed from individual elements as small as 0.0005 in. and 0.040 in., for example. Wire rope 120 may additionally be made of specialized materials suitable for use in small-scale medical device applications, including stainless steel, Co—Cr alloys, titanium alloys, shape memory alloys including NiTi (Nitinol), and tungsten, for example.

In an alternative embodiment, wire rope 120 may be made from polymer fibers or threads, or yarns. Exemplary materials for polymer-based assemblies include high-strength polymers such as Kevlar and Vectran.

Wire rope 120 is initially loosely connected to fitting 10 by passing rope 120 through bore 14. Bore 14 is sized to easily receive wire rope 120, such that a void is created between the inner surface of bore 14 and the various opposing outer surfaces of wire rope 120. Wire rope 120 has a length defined between its two terminal ends, and fitting 10 may be positioned along the length of the wire rope 120 and spaced from each of the terminal ends.

Fitting 10 is then placed upon die 202 of forging apparatus 200 with rope 120 fitted thereto. Die 204 descends to impact the upper boss 16 of fitting 10 and apply a force along axis A1 (FIG. 3), while the lower boss 16 simultaneously receives an equal force from its contact with die 204. These forces displace the volume of bosses 16 into the aforementioned void between wire rope 120 and bore 14. This flow of material eliminates bosses 16, such that exterior surface 18 is converted into a substantially planar exterior surface 118 across the extent of the newly formed, finished fitting 100. At the same time, the outer shape (e.g., cylindricity) of outer surface 12 of fitting 10 is maintained by is constraint within die 204. After forging, cylindrical outer surface 112 (FIG. 4) may be substantially identical to surface 12 or may be slightly enlarged. In any case, the dimension and configuration of outer surface 112 is precisely controlled by die 204 as the material of bosses 16 flows into bore 14, resulting in a straight-sided outer surface 112 of the same general configuration as surface 12 described in detail above.

The flow of material from bosses 16 into bore 14, combined with the exterior constraint provided by die 204, causes material flow into the various valleys and interstices between the individual wire elements and/or wire strands making up the multifilament wire rope 120. This creates a complex, multi-faceted interface between the deformed interior surface of bore 14 and the adjacent exterior surface of cable 120, which in turn creates a firm and reliable fixed coupling between fitting 100 and cable 120.

As noted above, bosses 16 are shown as truncated conical features designed to flow as described above during the forging operation. However, bosses 16 may take any shape or size to fill any particular void during the forging operation, as required or desired for a particular application.

In one alternative embodiment, a multi-sided die may be used to encapsulate the exterior surface 12 of fitting 10 during the forging operation, such as for application where additional dimensional stability around exterior surface 12 is required for the finished, crimped fitting 100.

Advantageously, the present method and apparatus facilitates the production of finished cable/fitting assemblies using a single pressing operation, while retaining high dimensional accuracy and exceptional break-load specifications. In one exemplary embodiment, for example, the precursor fitting 10 may have a nominal outer diameter of 0.065 inches, with a tolerance of ±0.001 inches. Its overall length between surfaces 18 may be 0.045 inches, with a tolerance of ±0.002 inches. The nominal diameter of bore 14 may be 0.026 inches, with a tolerance of +0.001 inches and −0.000 inches. Bosses 16 may be between 0.007 and 0.009 inches proud of their respective adjacent surfaces 18, depending on the size and configuration of the mating wire rope 120. In the illustrated embodiment, bosses 16 define lands at their outer surfaces with a diameter of 0.022 inches, while the bases of bosses 16 at their respective interfaces with surfaces 18 have a diameter of 0.045 inches. Thus, the angled surfaces of bosses 16 define an angle between 32 and 42 degrees with surfaces 18, depending on how far proud the bosses 16 sit from surfaces 18.

Precursor 10 and fitting 100 may be made from any suitable material, such as stainless steel, Co—Cr alloys, or titanium alloys as may be required or desired for a particular application, such as a medical device. Precursor and fitting 100 may have a diameter between 0.020 in. and 0.250 in., such as for medical device applications. Generally speaking, precursor 10 and fitting 100 may be softer and/or more ductile by comparison to wire rope 120 where wire rope 120 is made from a metal material. For example, precursor 10 may be annealed and relieved of most or all cold work prior to the forging operation, while wire rope 120 may be include retained cold work after final processing (such as cold drawing). In embodiments where wire rope 120 is made from polymer, precursor 10 and fitting 100 may be harder than wire rope 120.

After the forging operation shown in FIG. 6 and described above, the finished fitting 100 may have the specifications shown in Table 1:

TABLE 1

Finished Specifications of an Exemplary Fitting

OD := 1.7 mm = 0.0669 in
Tolerance := 0.05 mm = 0.00197 in
USL := OD + Tolerance = 0.069 in USL = 1.75 mm $$\text{Measured} := \begin{bmatrix} 0.0693 \\ .0697 \end{bmatrix} \text{in} = \begin{bmatrix} 1.76 \\ 1.77 \end{bmatrix} \text{mm}$$

$$\text{OOS\_large} := \text{Measured} - USL = \begin{bmatrix} 0.01 \\ 0.02 \end{bmatrix} \text{mm}$$

Wire ropes assembled to fittings made in accordance with the present disclosure may be efficiently produced in large volumes, while retaining high dimensional tolerances as demonstrated in Table 1. Moreover, dimensional control is enhanced with the present methods and apparatuses, because outer surfaces 12 of fittings 10 need not be further processed after conversion to fitting 100. Rather, outer surface 12 may be left "as machined" after fixation to cable 120. That is, fitting 100 is ready for service after the forging operation, without any further processing needed for outer surface 112 or end surfaces 118. This also avoids any contamination or debris formed during EDM or grinding processes associated with prior wire rope fittings, rendering the present process compatible with clean room operations.

Further, wire ropes 120 having fittings 100 affixed thereto demonstrate an ability to withstand high and repeated applications of force. In one typical application, wire rope 120 is used in a "PULL-PULL" actuation modality, where either end of wire rope 120 experiences a tensile force designed to rotate fitting 100. As fitting 100 rotates, a rotational moment is applied to one of end surfaces 118, and this moment may be used to drive a load, such as actuation of an end effector of a surgical robot, for example. In this type of application, the fitting 100 shown in Table 1 exhibits an ability to withstand peak forces of at least 75 lbf, and in some cases in excess of 100 lbf. when paired with wire rope 120 having a baseline tensile strength well in excess of 100 lbf.

Fitting 100 also demonstrates high force tolerance for slippage with respect to wire rope 120. In the exemplary embodiment shown and described herein, for example, fitting 100 may withstand a pull force of 80 lb. relative to wire rope 120 without slipping from its original, forged-in-place position. More generally, fittings and wire ropes made in accordance with the present disclosure can achieve a slippage tolerance for the fitting of at least 80% of the break load of the cable to which the fitting is attached. This is superior to predicate devices, which typically experience slippage at 60% of break load or less, and an important metric for medical device applications, where slippage may result in unintended actuation characteristics of the device.

The present apparatus and method of producing fitting 100 also maximizes the wall thickness at the thinnest part of fitting 100, while remaining within any size and/or volume constraints particular to the end-use application. This maximized thickness contributes to the high force-transfer and holding capacities demonstrated above. In contrast to fittings applied by peening or indenting a section of the fitting for cable attachment, the presence of bosses 16 preserves larger final minimum thicknesses which can contribute to a strong finished assembly. For example, testing of exemplary wire ropes 120 and fittings 100 as shown in Table 1 has demonstrated break load forces for the finished assembly in excess of 60% of the break load of the wire rope 120 without any fittings attached.

In addition, the overall finished volume of fitting 100 may be reduced compared to prior fitting designs, thereby enabling smaller wire rope/fitting assemblies and therefore smaller end-effector devices, without any compromise in device capability and force transfer characteristics.

Fittings 100 may be attached to cable 120 in a pre-passivated form, because post-affixation processing such as grinding need not be performed as noted above. Thus the present process may retain compatibility with some cable materials such as tungsten for which passivation would otherwise pose a barrier to production.

In one application, the present process may be automated or otherwise integrated into the manufacture of finished devices. For example, a device component may be used as the die into which fitting 10 is placed, such that the forging operation couples fitting 110 to wire rope 120 while simultaneously coupling fitting 110 to its mating device component.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. An actuator assembly comprising:
a wire rope including a plurality of wire elements, the wire rope having a pair of opposing terminal ends; and
a fitting fixed along a length of the wire rope and spaced from each of the pair of opposing terminal ends, the fitting comprising:
a body with a straight-sided sidewall defining a longitudinal body axis;
an aperture formed through the straight-sided sidewall of the body, the aperture defining a longitudinal aperture axis substantially perpendicular to the body axis; and
a pair of end surfaces defining opposing longitudinal ends of the body, wherein the pair of end surfaces are each substantially planar across an entirety of the respective end surface.

2. The actuator assembly of claim 1, wherein each of the pair of end surfaces is substantially parallel to the aperture axis.

3. The actuator assembly of claim 1, wherein the body of the fitting is one of cylindrical, cuboid and prismatic.

4. The actuator assembly of claim 1, wherein the straight-sided sidewall of the body defines a linear profile in the plane of the body axis.

5. The actuator assembly of claim 1, wherein the aperture includes a deformed interior surface creating a multi-faceted interface with valleys and interstices between the plurality of wire elements of the wire rope.

6. The actuator assembly of claim 1, wherein the wire rope has a diameter between 0.0015 in and 0.187 in.

7. The actuator assembly of claim 6, wherein the wire rope is made from one of stainless steel, Co—Cr alloys, titanium alloys, shape memory alloys including NiTi, and tungsten.

8. The actuator assembly of claim 6, wherein the fitting has an outer diameter between 0.020 in and 0.250 in.

9. The actuator assembly of claim 6, wherein the fitting can withstand a pull force of at least 80% of a break-load strength of the wire rope without slipping relative to the wire rope.

10. The actuator assembly of claim 6, wherein the fitting can withstand a rotational moment of at least 75 lbf relative to the wire rope.

11. The actuator assembly of claim 1, wherein the body defines a maximum lateral extent extending laterally away from the longitudinal body axis, the substantially planar end surfaces extending across more than 95% of the maximum lateral extent.

12. The actuator assembly of claim 1, wherein each of the pair of end surfaces occupies an area bounded by the straight-sided sidewall.

13. A precursor fitting system, comprising:
a wire rope including a plurality of wire elements; and
a straight-sided body defining a longitudinal body axis, the body comprising;
an aperture formed through the straight-sided body, the aperture defining a longitudinal aperture axis substantially perpendicular to the body axis and sized to receive the wire rope such that a void is formed between the wire rope and an interior surface of the aperture;
a pair of opposing ends of the straight-sided body; and
a pair of bosses sitting proud of the respective pair of opposing ends, the pair of bosses collectively defining a volume commensurate with a volume of the void.

14. The precursor fitting system of claim 13, wherein each of the pair of bosses defines an angled surface meeting the adjacent one of the pair of end surfaces.

15. The precursor fitting system of claim 14, wherein the angled surface forms a truncated conical shape.

16. The precursor fitting system of claim 14, wherein the angled surface is one of a plurality of angled surfaces corresponding to sides of the straight-sided body.

17. The precursor fitting system of claim 13, wherein the pair of bosses are sized and configured form a pair of opposing end surfaces that are substantially planar after the material flow into the aperture, the pair of opposing end surfaces being substantially planar and extending across an entirety of each of the pair of opposing ends.

18. A method of affixing a fitting to a wire rope, comprising:
passing the wire rope through an aperture formed in the fitting, the wire rope having a plurality of wire elements and the aperture defining an aperture axis;
impacting an end surface of the fitting to cause material to flow into the aperture and into contact with the wire rope; and
by the step of impacting, forming an end surface of the fitting that is substantially planar across an entirety of the end surface and is substantially parallel to the aperture axis.

19. The method of claim 18, wherein the step of impacting comprises impacting a boss sitting proud of the end surface of the fitting.

20. The method of claim 19, wherein the step of impacting the boss comprises causing a flow of material into the aperture having a volume that is substantially equal to a volume of the boss.

21. The method of claim 20, wherein the step of impacting comprises causing material to flow into interstices between the plurality of wire elements of the wire rope.

22. The method of claim 18, further comprising placing the fitting into a die before the step of impacting, whereby an exterior surface of the fitting conforms to the die after the step of impacting.

23. The method of claim 18, wherein the fitting is placed along a length of the wire rope, spaced from each respective end of the wire rope.

24. The method of claim 18, wherein the step of forming comprises forming the end surface of the fitting to occupy an area bounded by the straight-sided sidewall.

* * * * *